United States Patent
Pañeda Palacio

(10) Patent No.: US 10,913,305 B2
(45) Date of Patent: Feb. 9, 2021

(54) SELF-ADHESIVE AND REUSABLE NOTES SUPPORT

(71) Applicant: María Dolores Pañeda Palacio, Pontevedra (ES)

(72) Inventor: María Dolores Pañeda Palacio, Pontevedra (ES)

( * ) Notice: Subject to any disclaimer, the term of this patent is extended or adjusted under 35 U.S.C. 154(b) by 343 days.

(21) Appl. No.: 15/962,329

(22) Filed: Apr. 25, 2018

(65) Prior Publication Data

US 2018/0311995 A1 Nov. 1, 2018

(30) Foreign Application Priority Data

Apr. 25, 2017 (ES) .............................. 201730481 U

(51) Int. Cl.
| | |
|---|---|
| B43L 1/00 | (2006.01) |
| B42D 5/00 | (2006.01) |
| F16B 47/00 | (2006.01) |
| B32B 27/08 | (2006.01) |
| B32B 27/30 | (2006.01) |

(52) U.S. Cl.
CPC ............... B43L 1/00 (2013.01); B42D 5/003 (2013.01); F16B 47/00 (2013.01); B32B 27/08 (2013.01); B32B 27/304 (2013.01); B32B 2307/412 (2013.01)

(58) Field of Classification Search
CPC ........................................................ B43L 1/00
USPC .................... 434/273, 408, 413, 421, 428
See application file for complete search history.

(56) References Cited

U.S. PATENT DOCUMENTS

| 4,652,239 A * | 3/1987 | Brimberg ................. B43L 1/12 40/594 |
| 5,137,453 A * | 8/1992 | Hudson ................. A47K 3/281 24/306 |
| 5,207,582 A * | 5/1993 | Michelson ................ B43L 3/00 434/408 |
| 5,430,965 A * | 7/1995 | Lai ............................ G09F 7/18 40/358 |
| 5,494,442 A * | 2/1996 | Hecht ..................... G09B 23/28 434/267 |

(Continued)

FOREIGN PATENT DOCUMENTS

| DE | 8615468 U1 | 10/1986 |
| GB | 2447859 A | 10/2008 |

(Continued)

*Primary Examiner* — Kurt Fernstrom
(74) *Attorney, Agent, or Firm* — The Webb Law Firm

(57) ABSTRACT

A self-adhesive and reusable support for notes is disclosed. The support comprises a flat laminar body (1-1'-1") that in turn comprises a first flat surface (10) and a second flat surface (11) opposite from the first surface. The flat laminar body comprises micro suction cups (3) distributed in a staggered pattern on the first flat surface and a writable surface (4) on the second surface. The self-adhesive and reusable support for notes is manufactured from opaque polymeric calendered vinyl. The support is reusable, meaning that it can be used as many times as desired, without the risk of losing the self-adhesive properties thereof even when the location thereof is constantly changed, as well as writing with marker or highlighter and erasing it again. Due to the nature thereof, it is especially suitable for use in the Kanban method.

10 Claims, 4 Drawing Sheets

(56) References Cited

U.S. PATENT DOCUMENTS

| | | | |
|---|---|---|---|
| 5,913,686 A * | 6/1999 | Vanwinkle | G09B 23/30 434/262 |
| 6,251,500 B1 * | 6/2001 | Varga | B41M 3/18 428/195.1 |
| 6,526,618 B1 * | 3/2003 | Bolton | A47K 7/024 15/104.92 |
| 7,278,621 B1 * | 10/2007 | Bareis | A47B 97/04 248/441.1 |
| 7,901,213 B1 * | 3/2011 | Beno | B43K 23/001 434/408 |
| 9,420,921 B1 * | 8/2016 | Mercado | A47K 7/024 |
| 9,659,506 B2 * | 5/2017 | Ugolini | G09B 23/00 |
| 2005/0136390 A1 * | 6/2005 | Galbraith Coates | B43L 5/007 434/408 |
| 2007/0094904 A1 * | 5/2007 | Frank | G09F 7/12 40/594 |
| 2008/0113150 A1 * | 5/2008 | Lee | F16B 47/00 428/99 |
| 2009/0050505 A1 * | 2/2009 | Rubin | B42D 15/042 206/459.5 |
| 2012/0074680 A1 * | 3/2012 | Kountotsis | B42D 13/00 283/56 |
| 2014/0220546 A1 * | 8/2014 | Mandel | G09B 19/00 434/428 |
| 2015/0320196 A1 * | 11/2015 | Polizzi | A47B 5/06 320/101 |
| 2016/0075170 A1 * | 3/2016 | Kleppen | B32B 29/02 434/413 |
| 2017/0055746 A1 * | 3/2017 | Anderson | A47G 11/003 |

FOREIGN PATENT DOCUMENTS

| | | |
|---|---|---|
| GB | 2484985 A | 5/2012 |
| WO | 2016122148 A1 | 8/2016 |

* cited by examiner

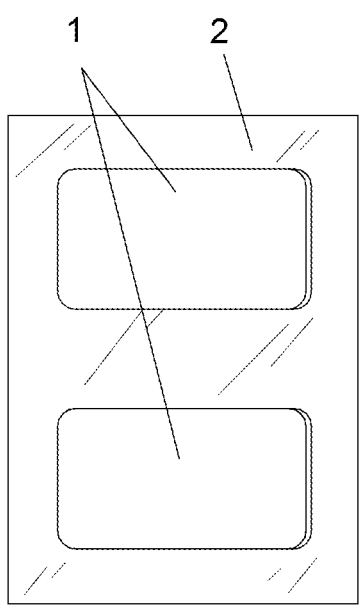
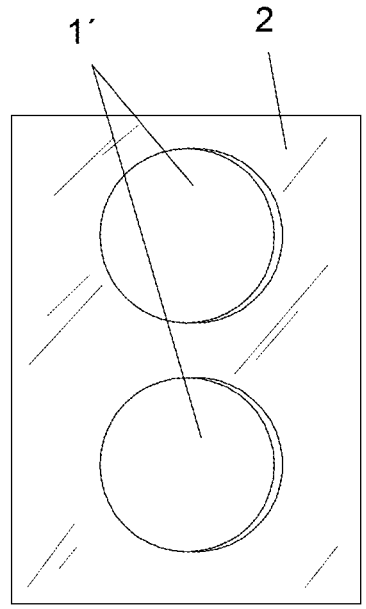
FIG. 1  FIG. 2
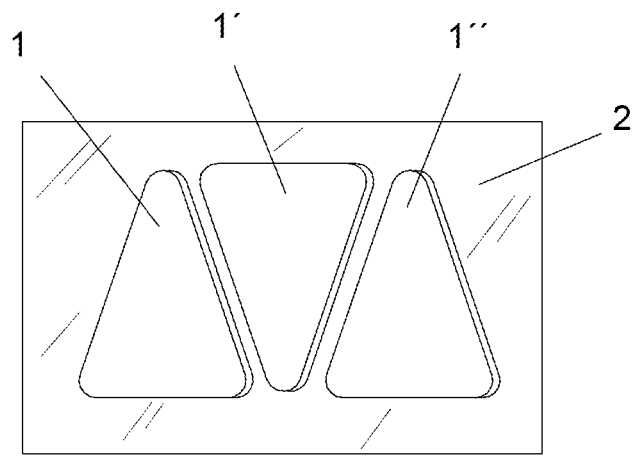
FIG. 3

SELF-ADHESIVE AND REUSABLE NOTES SUPPORT

CROSS REFERENCE TO RELATED APPLICATION

This application claims priority to Spanish Utility Model Application No. U201730481 filed Apr. 25, 2017, the disclosure of which is hereby incorporated in its entirety by reference.

BACKGROUND OF THE INVENTION

The present invention refers to a support for notes, of the type used to leave very visible annotations on any surface, according to the self-adhesive characteristics of the support itself.

The object of the invention is to provide a support that is reusable, meaning that it can be used as many times as desired, without the risk of losing the self-adhesive properties thereof even when the location thereof is constantly changed, as well as writing with marker or highlighter and erasing it again. Due to the nature thereof, it is especially suitable for use in the Kanban method and in any other collaborative or team method.

Thus, the object of the invention is to provide an environmentally-friendly device, according to the capacity thereof to be used endlessly, as opposed to the current "disposable" culture.

DESCRIPTION OF RELATED ART

In the scope of practical application of the invention, when leaving a note in a place that is sufficiently visible so that it does not go unnoticed, it is common to use self-adhesive paper cards, commonly known as "post-its", which have a series of limitations or defects, among them:
They include a relatively small adherent area in comparison to the back surface of the card.
The adhesive that they include tends to stop performing properly when the device is taken off again and again, which essentially makes it single-use.
It has a very short useful life.
The very nature thereof makes it not resistant to water, moisture, etc.

SUMMARY OF THE INVENTION

The self-adhesive and reusable support for notes that is recommended offers a completely satisfactory solution to the problem set out above, based on a simple but effective solution.

In an embodiment of the invention, the self-adhesive and reusable support for notes comprises a flat laminar body that in turn comprises a first flat surface and a second flat surface opposite from the first surface. The flat laminar body comprises micro suction cups distributed on the first flat surface and a writable surface on the second surface. The micro suction cups are preferably distributed in a staggered pattern on the first flat surface, even though any other distribution would be possible. The flat laminar body is obtained starting from opaque polymeric calendered vinyl. The micro suction cups facilitate the adherence of the flat laminar body both on surfaces that are smooth and surfaces with a certain degree of roughness. Optionally, the support can comprise a vinyl sheet on which the flat laminar body is arranged. The vinyl sheet is preferably transparent.

The support of the invention is made from an environmentally-friendly flat body of any suitable configuration and color. The writable surface is selected from a PVC layer, a plastic layer, or a layer of applied paint.

The micro suction cups have a semi-spherical shape with a flat area on the part opposite from the open area. The flat area has a radius between 30% and 70% of the radius of the open area. Preferably, the flat area has a radius between 40% and 60%, more preferably, it has a radius of 50% where optimal gripping values are obtained. The micro suction cups distributed in a staggered pattern on the first flat surface occupy at least 50% of the surface of the first flat surface. The part of the first surface not occupied by suction cups is used as a gripping surface so that the user may remove the flat laminar body from the place to which it is adhered. When the micro suction cups are distributed on the entirety of the first flat surface, the flat laminar body can optionally comprise a flap or tab so that the user may remove the flat laminar body from the place to which it is adhered.

Therefore, a device is obtained that can be used as many times as deemed convenient, by simply erasing the markings made thereon, unsticking it and being able to adhere it again to the surface where it is deemed convenient as many times as necessary, such that, if the device loses the adherent capacity thereof, due to the dirt existing on the surface to which it has been adhered, it can simply be washed with soap and water and the performance thereof would be reestablished, thereby achieving an optimal degree of adherence according to the structure based on micro-suction cups.

In another aspect of the invention, a self-adhesive and reusable support assembly for notes is disclosed, comprising at least two self-adhesive and reusable supports for notes as defined in any one of the embodiments of the first aspect of the invention. Particularly, one self-adhesive and reusable support for notes is situated over the other self-adhesive and reusable support for notes.

BRIEF DESCRIPTION OF THE DRAWINGS

As a complement to the description that will be provided herein, and for the purpose of helping to make the features of the invention more readily understandable, according to a preferred practical exemplary embodiment thereof, said description is accompanied by a set of drawings constituting an integral part thereof which, by way of illustration and not limitation, the following is represented:

FIG. 1 shows a plan view of a self-adhesive and reusable support for notes made according to the object of the present invention.

FIG. 2 shows a plan view of a second embodiment of the device.

FIG. 3 shows a plan view of a third embodiment of the multiple possible embodiments for the support of the invention.

DESCRIPTION OF THE INVENTION

In light of the figures discussed above, it can be seen how the support of the invention is made from a series of laminar bodies 1-1'-1", the dimensions, configuration and color of which can vary depending on the specific needs of each case, sheets being shown in the figures, as merely exemplary solutions, have rectangular, circular and triangular configurations, respectively, with rounded borders, although they could be sharp, having any other configuration or color, without this affecting the essence of the invention.

As seen in the figures, the laminar bodies 1-1'-1" that define the support for notes are supplied on a transparent vinyl sheet 2 or similar, of reduced thickness, which facilitates the unsticking thereof.

The adhesion effect that the laminar bodies 1-1'-1" have comes from the very nature thereof, specifically by being obtained based on opaque polymeric calendered vinyl, such that said calendering process defines, on the surface of the laminar bodies 1-1'-1", a plurality of tiny micro suction cups which facilitates the adherence thereof both on surfaces that are smooth and surfaces with a certain degree of roughness, as many times as necessary, so useful life of these laminar bodies 1-1'-1" is much longer, the adhesive character thereof only being affected by the excess of dirt, in which case it would be as simple as washing the laminar bodies 1-1'-1" with soap and water in order to reestablish the adhesive properties thereof.

In this manner, a device is achieved that can be easily implanted on almost any surface, it is writable, and it can be erased as many times as desired, which gives it a multi-use character that makes it very environmentally friendly, together with the biodegradable nature thereof, as opposed to the "disposable" culture that supports of this type have had until now.

Figure 4:
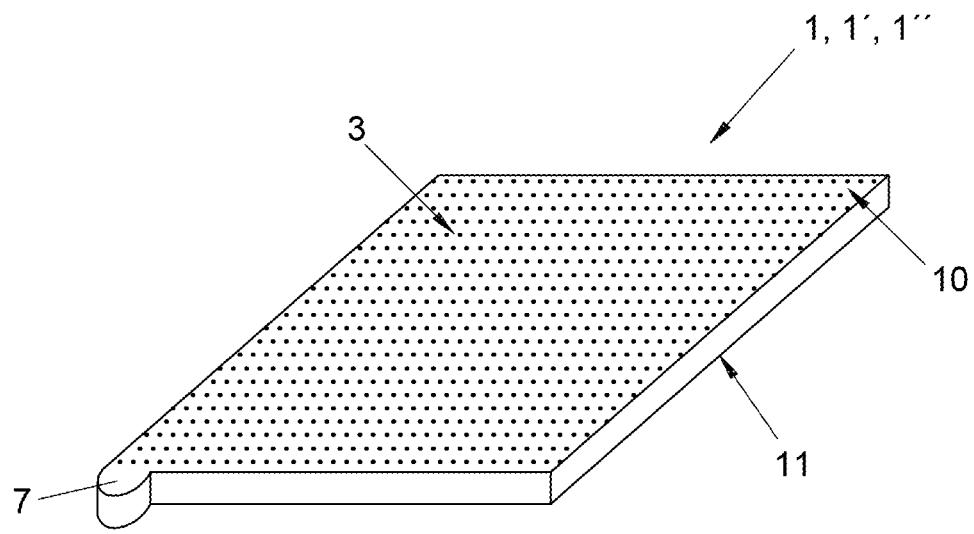
FIG. 4 shows a view of the laminar body where the micro suction cups distributed in a staggered pattern are shown.
Figure 5:
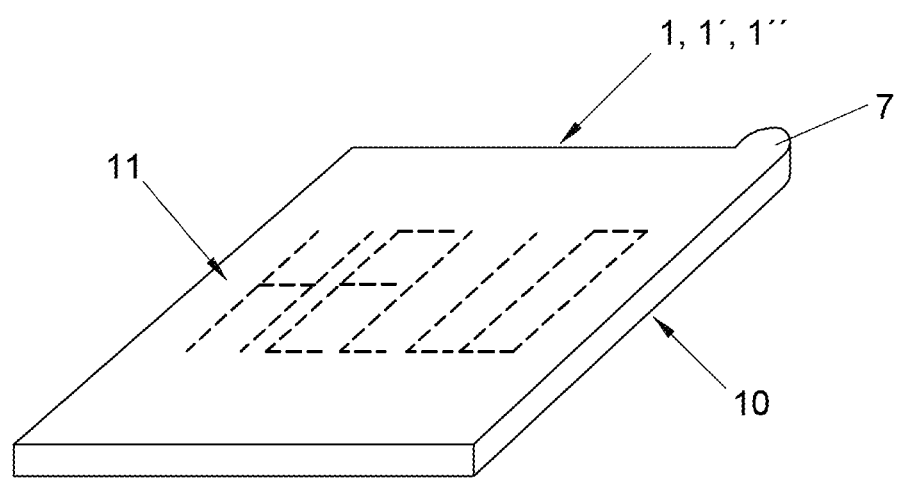
FIG. 5 shows a view of the laminar body where the message "HELLO" is shown on the part opposite from the part comprising the micro suction cups.

FIGS. 4 and 5 show the back and the front of the flat laminar body 1-1'-1", respectively. Likewise, the first flat surface 10 which comprises the micro suction cups distributed in a staggered pattern and the second flat surface 11 which shows the message "HELLO" as an illustrative example are shown, both surfaces 10 and 11 comprised in the laminar body 1-1'-1". Additionally, FIG. 4 shows the tab 7.

Figure 6:
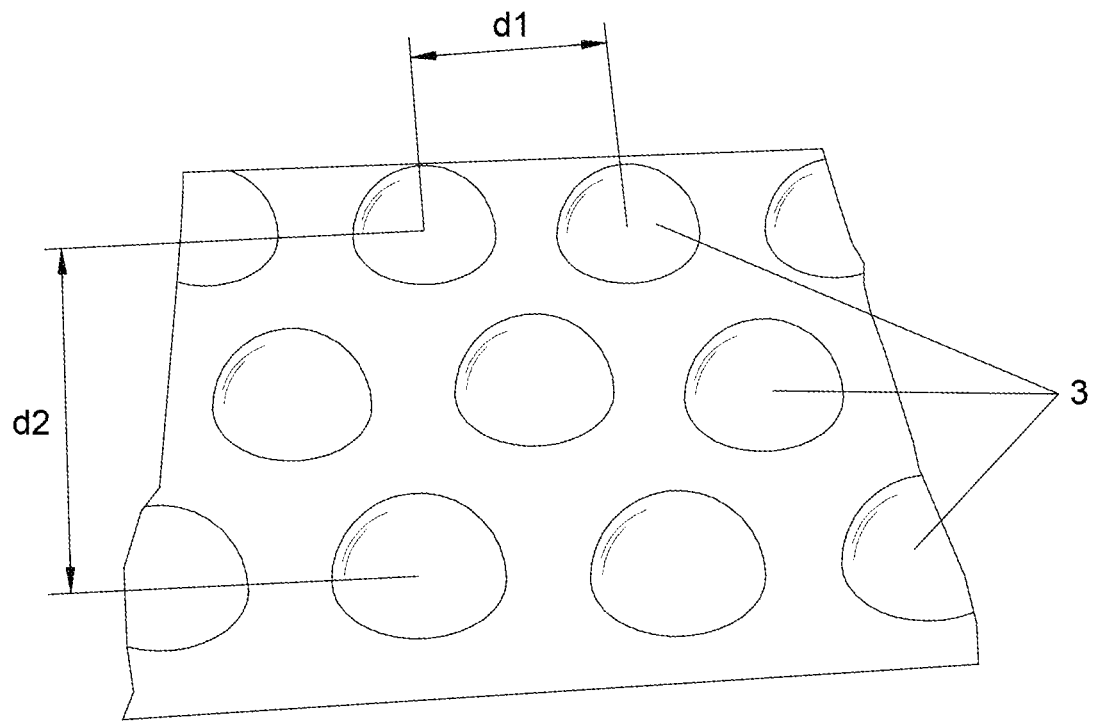
FIG. 6 shows an enlarged view of the laminar body where the micro suction cups distributed in a staggered pattern are shown.
Figure 7:
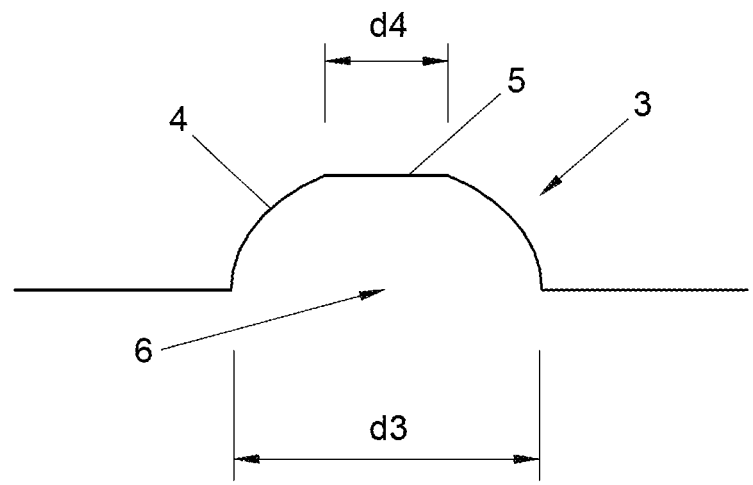
FIG. 7 shows a cross-sectional view of a micro suction cup.

FIG. 6 shows a microscopic view of the flat laminar body where the micro-suction cups 3 distributed in a staggered pattern and the distance between them are shown. As an illustrative example, $d_1$=2.45 mm and $d_2$=1.42 mm. FIG. 7 shows the shape and the size of the micro suction cups 3. Specifically, the micro suction cups 3 have a semi-spherical shape 4 that defines an opening 6 and, on the side opposite from the opening 6, the micro suction cup has a flat area 5. As an illustrative example, $d_3$=1 mm and $d_4$=0.5 mm.

Figure 8:
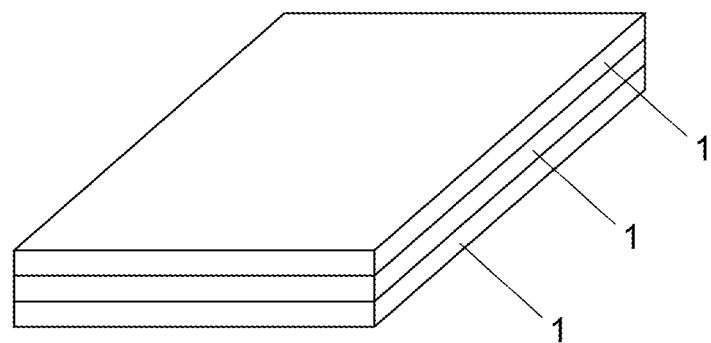
FIG. 8 shows a view of an assembly made up of three laminar bodies of the same size.
Figure 9:
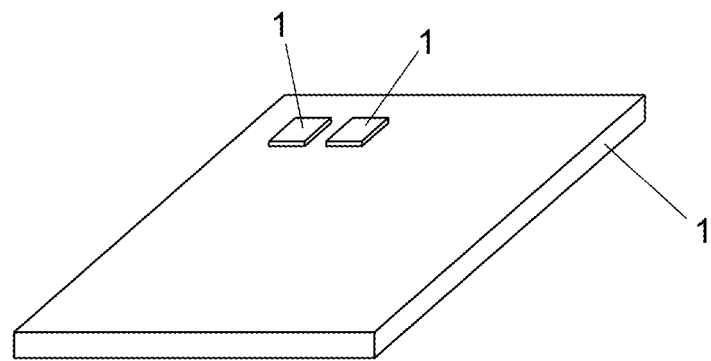
FIG. 9 shows a view of an assembly made up of three laminar bodies where one is larger than the other two.

Finally, FIGS. 8 and 9 show a view of an assembly made up of three laminar bodies 1 that are adhered to each other by means of the micro suction cups 3. In the case of FIG. 8, the three laminar bodies 1 are the same size. In the case of FIG. 9, one of the three laminar bodies 1 is larger than the other two.

The invention claimed is:

1. A self-adhesive and reusable support for notes, wherein said support comprises a flat laminar body that in turn comprises a first flat surface and a second flat surface opposite to the first flat surface, wherein the first flat surface comprises drilled suction micro-cups, and wherein the suction micro-cups are distributed in a staggered pattern on the first flat surface occupying at least 50% of the surface of the first flat surface, the flat laminar body having a writable surface on the second flat surface.

2. The self-adhesive and reusable support for notes according to claim 1, wherein the flat laminar body comprising the suction micro-cups distributed in a staggered pattern on the first flat surface is obtained from opaque polymeric calendered vinyl.

3. The self-adhesive and reusable support for notes according to claim 1, wherein the support additionally comprises a vinyl sheet on which the flat laminar body is arranged, wherein the vinyl sheet is provided for facilitating an un-sticking of laminar bodies.

4. The self-adhesive and reusable support for notes, according to claim 3, wherein the vinyl sheet is transparent.

5. The self-adhesive and reusable support for notes according to claim 1, wherein the suction micro-cups have a semi-spherical shape with a flat area on the part opposite from an open area.

6. The self-adhesive and reusable support for notes according to claim 5, wherein said flat area has a radius between 30% and 70% of the radius of the open area.

7. The self-adhesive and reusable support for notes according to claim 1, wherein the writable surface is selected from a PVC layer, a plastic layer, or a layer of applied paint.

8. The self-adhesive and reusable support for notes according to claim 1, wherein the flat laminar body additionally comprises a tab.

9. A self-adhesive and reusable support assembly for notes, comprising at least two self-adhesive and reusable supports for notes as defined by claim 1.

10. The self-adhesive and reusable support assembly for notes according to claim 9, wherein one self-adhesive and reusable support for notes is situated over the other self-adhesive and reusable support for notes.

* * * * *